United States Patent [19]

Kugelman

[11] Patent Number: 4,514,619

[45] Date of Patent: Apr. 30, 1985

[54] INDIRECT CURRENT MONITORING VIA VOLTAGE AND IMPEDANCE MONITORING

[75] Inventor: Michael M. Kugelman, Akron, Ohio

[73] Assignee: The B. F. Goodrich Company, New York, N.Y.

[21] Appl. No.: 431,951

[22] Filed: Sep. 30, 1982

[51] Int. Cl.³ .............................................. H05B 1/02
[52] U.S. Cl. ..................... 219/483; 364/483; 324/76 R; 219/497; 219/202; 307/39; 244/134 D
[58] Field of Search .................. 323/283, 235, 319; 219/494, 497, 202, 203, 501, 483, 485, 486, 490, 492, 493; 244/134 R, 134 D; 364/483; 324/76 R, 126; 307/39–41

[56] References Cited

U.S. PATENT DOCUMENTS

| | | | |
|---|---|---|---|
| 3,453,415 | 7/1969 | Hermes et al. | 219/486 |
| 3,789,190 | 1/1974 | O'rosy et al. | 219/499 |
| 4,161,691 | 7/1979 | Vermeers | 364/483 |
| 4,315,316 | 2/1982 | Boros et al. | 323/283 |

Primary Examiner—M. H. Paschall
Attorney, Agent, or Firm—Joseph Januszkiewicz

[57] ABSTRACT

Electrical circuitry for monitoring the current flow through resistance elements on the leading edge of an aircraft wing or horizontal stabilizer. The resistance elements are individually and sequentially activated for heating to thereby effect a de-icing or anti-icing function. The non-activated elements are sensed by the circuitry to determine inferentially if there is a predetermined current flow through the heating elements to achieve the intended de-icing or anti-icing function.

3 Claims, 4 Drawing Figures

INDIRECT CURRENT MONITORING VIA VOLTAGE AND IMPEDANCE MONITORING

FIELD OF THE INVENTION

This invention relates to a circuit for monitoring current and, more specifically, to a circuit for monitoring current inferentially. The circuit has particular utility in aircraft de-icing and anti-icing systems in which electrical power is delivered from a source of potential to heating elements on the leading edges of aircraft wings, horizontal stabilizers or the like. The circuit functions to detect whether or not the current is being properly delivered to achieve the heating function.

BACKGROUND OF THE INVENTION

In the de-icing and anti-icing of aircraft wings, horizontal stabilizers, or the like, a plurality of techniques has been utilized in the prior art. For example, pneumatic boots of rubber or other flexible material are provided to overlay the leading edges and are periodically provided with pulses of air or other aeroform fluid to de-ice by causing the periodic expansion and contraction of the surface in a manner to crack and remove any ice which might otherwise be formed thereon. Failure to remove the ice would cause a lack of manuverability of the aircraft. In an alternate approach, particularly in jet aircraft, the engine-bleed-exhaust may directly heat the wings of the aircraft including the leading edge thereof to anti-ice by precluding ice formation in the first instance. A third technique, and that employed in accordance with the instant invention, includes the electrical energizing of resistance elements formed in the leading edges of aircrafts. Electrical energy is used to heat the resistance elements either to raise the leading edge to a temperature to melt the wing-to-ice bond for removing any ice which may have formed thereon. It can also be used to maintain the leading edge at a temperature range to prevent ice from forming in an anti-icer mode. In this third electrical technique, as in any similar electrical technique, electrical power is needed to achieve the de-icing or anti-icing function.

Typical arrangements for energizing electrical resistance pads for anti-icing or de-icing in aircrafts are disclosed in several prior art patents including U.S. Pat. No. 3,183,975 to Keen; U.S. Pat. No. 4,010,412 to Forman; and U.S. Pat. Nos. 4,036,457 and 3,420,476, the last two patents being issued to Volkner, et al. In each of these prior art disclosures, power is periodically provided to a plurality of resistance elements on the leading edges of aircraft wings or horizontal stabilizers for sequentially heating said elements to maintain the surface in an ice removing mode. In each of these devices, however, as in all the prior art, it is not clear that sufficiently convenient means are provided for detecting whether or not the proper current is flowing in a commercially acceptable manner to ensure proper safety of the aircraft and its occupants.

In the prior art, there is no technique found for monitoring the current to a load which does not include high cost, weight or other disadvantages. Typical electrical current monitors presently known which, theoretically, could be used in the de-icer or anti-icer applications consist basically of devices for directly measuring current by any one of various means: (a) the Hall effect, (b) measuring of the voltage drop across a known resistor in series with the load and using Ohms law to determine the current, and (c) using the electromagnetic field in a coil energized by either AC or DC current, as for example, current transformers, galvonometer movement or sensitive current relays, whether AC or DC.

In this regard, various prior art devices are known for measuring current in other than direct measurement and include the patents to Boros et al; Born et al; Harris, Jr. and Durbeck. Boros et al, U.S. Pat. No. 4,315,316 discloses a digital current monitoring system for estimating the current output of a switching regulator by monitoring the voltage on the regulator. The output of a voltage controlled oscillator is numerically compared to a reference value by means of a microprocessor. A state variable equation is involved to determine the current.

The patent to Born et al, U.S. Pat. No. 4,074,175 teaches the use of a circuit for generating a signal proportional to the average current of an inductive load. Current is directly measured in a free path and also in a load path. The two signals are then combined to provide an average current signal.

In the Boros patent, the voltage is monitored while current is inferred without reference to the impedance of the circuit. In Born et al, a loaded and unloaded current are directly measured and these measurements are used to calculate the average load current.

The patent to Harris, Jr., U.S. Pat. No. 3,445,763 shows an impedance measuring digital circuit including a differential amplifier.

Lastly, the patent to Durbeck, U.S. Pat. No. 3,569,785 shows a circuit which measures voltage, then current and calculates impedance.

These disclosures, like the totality of the prior art, require the knowledge of the parameters of the load or source or the like or, in the alternative, use known current detection techniques in achieving their objectives.

SUMMARY OF THE INVENTION

It is an object of the present invention to provide a circuit having utility in aircraft ice prevention or removal which is of a reduced cost, minimum size and weight while keeping electrical insertion losses to a minimum. The invention is characterized by measuring independently, on a multiplexed basis, two variables in an electrical circuit, i.e., voltage and impedance, and using these values to "infer" the value of the current without actually measuring it directly. Although the procedure may be considered conceptionally more complex than existing methods for determining current, by using micro-electronic components, which are relatively inexpensive, small and light, a circuit can be constructed in many cases for a lower cost and lighter weight than previously, important considerations in many applications, particularly in aircraft, where size, weight and cost along with increased reliability are at a premium.

BRIEF DESCRIPTION OF THE DRAWINGS

The invention is described further hereinbelow with reference to the accompanying drawings, wherein.

DESCRIPTION OF THE PREFERRED EMBODIMENT

Figure 1:
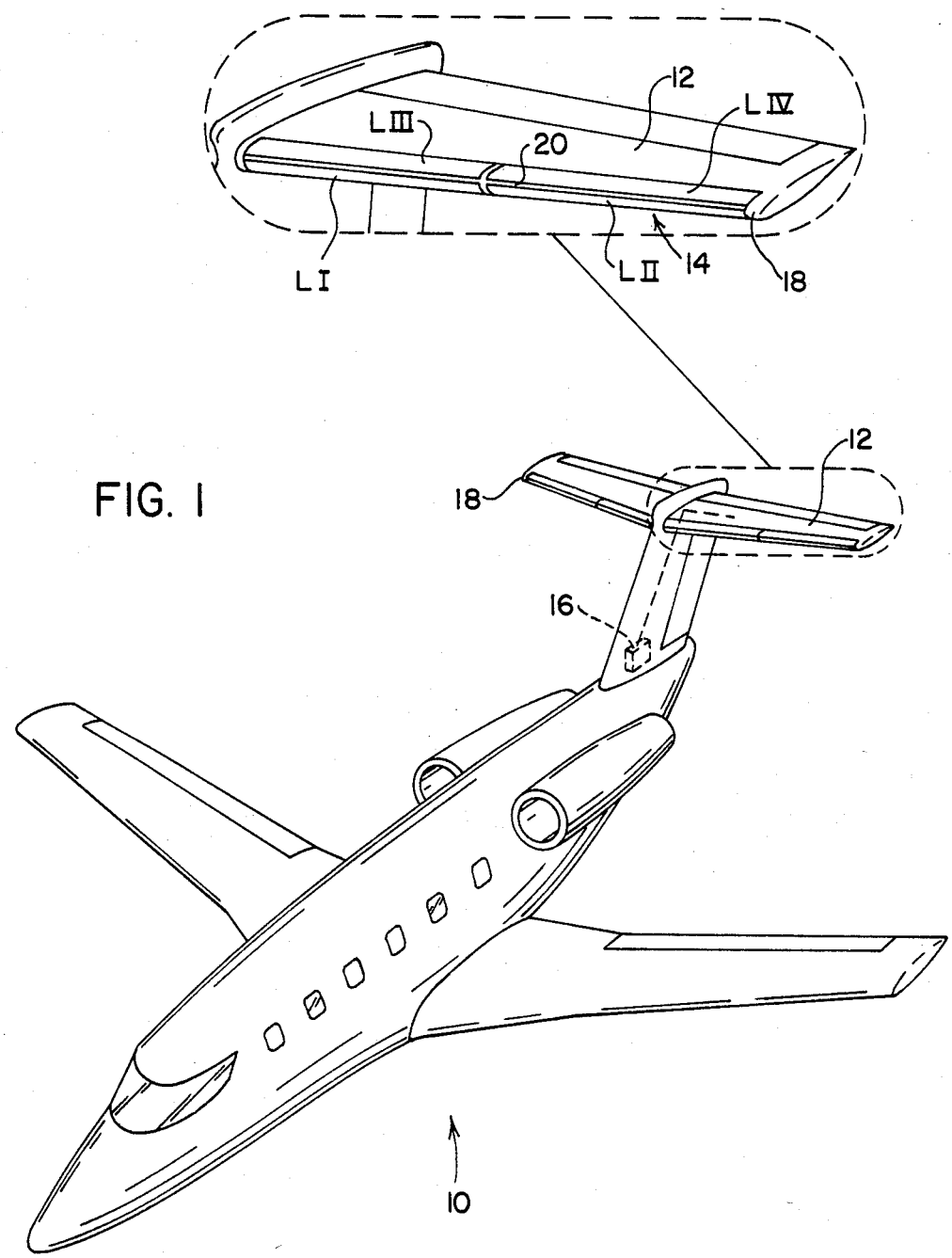
FIG. 1 is a schematic perspective representation of an embodiment of the invention mounted on an aircraft, an enlarged part of which is shown in a balloon thereabove.

Shown in FIG. 1 is an aircraft 10, provided at the leading edge of the horizontal stabilizer 12 with the heating device 14, power to which is controlled by the electrical control circuit 16 of the present invention. The heating device 14 is preferably constructed of four discrete electrical resistance elements LI, LII, LIII and LIV which function to sequentially become heated from a source of electrical power, PS, to remove ice formed on the leading edge 18 of the rear horizontal stabilizer on which the device is employed. In a cross-shaped fashion, separating the four heated sections is a heated parting strip 20 energized from the same source of electricity as the source powering the rest of the heating device. The circuit for heating the parting strip is not shown. It should be understood, however, that the present invention is equally pertinent to other applications such as the heating of the leading edge of an aircraft wing or in other applications independent of the de-icer or anti-icer field, fields where ever current has to be monitored for low cost, weight and space with maximum reliability.

Figure 2:
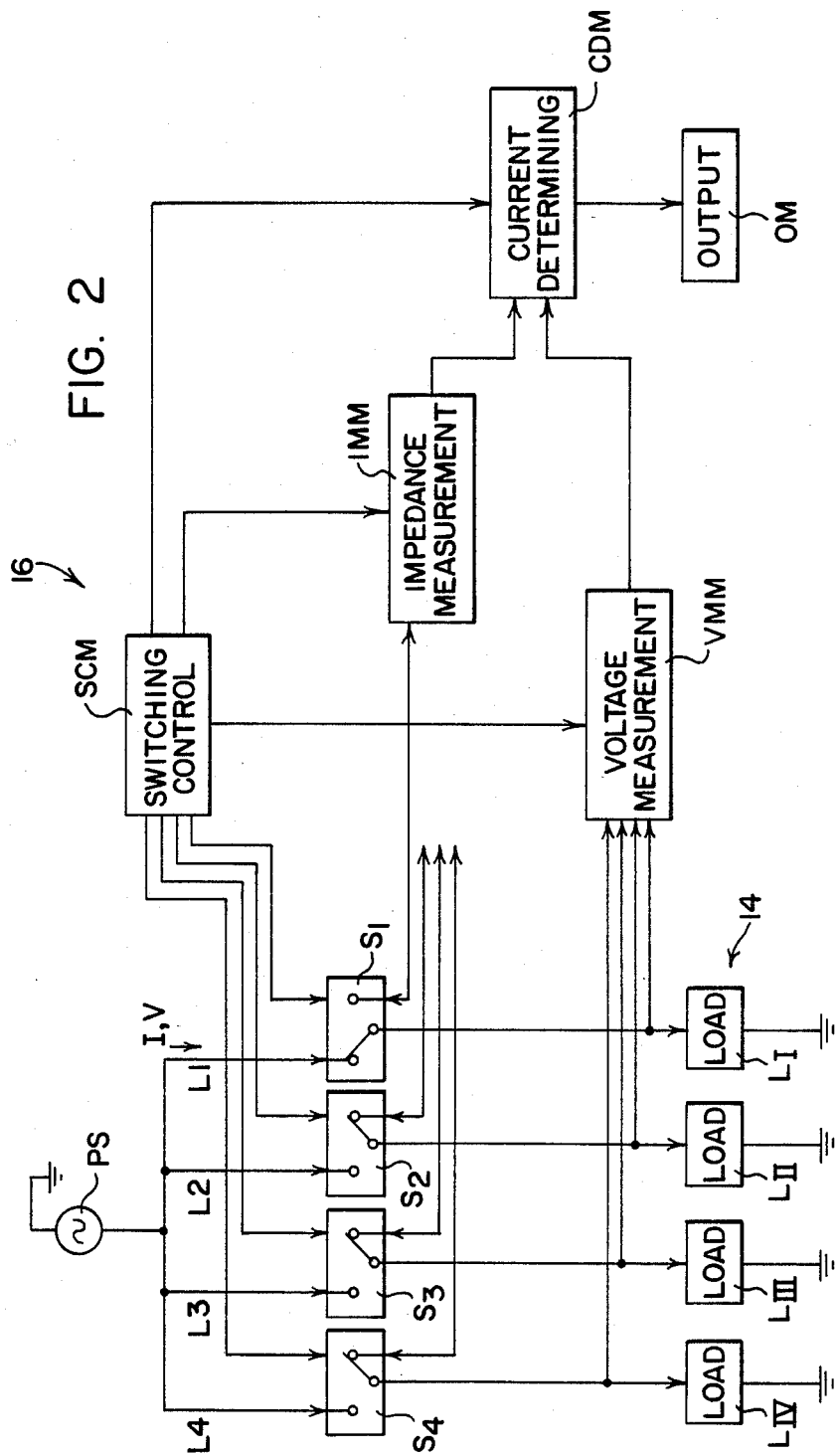
FIG. 2 shows a block diagram of one illustrative electrical control circuit constructed in accordance with the concepts of the instant invention.

In FIG. 2 there is disclosed a block diagram of a circuit for effecting the sequential heating of the de-icer segments and for the monitoring thereof. For illustrative purposes, four separate heating areas or load segments LI, LII, LIII and LIV are shown for the heating of one side of the horizontal stabilizer with four switches S1, S2, S3 and S4 coupled thereto. Only a single circuit is disclosed for controlling one of the load segments. However, it should be understood that for certain elements as hereinafter described, similar circuit components are provided for each of the switches and load segments even though only one such circuit is illustrated. A conventional source of alternating current and potential difference, PS is already provided on an aircraft on which the instant invention is to be utilized. The current provides power along parallel lead lines L1, L2, L3 and L4 to the four load segments through the plurality of switches. The switches are normally in a first position or mode, as shown in S1, to permit the current to flow to one of the load segments LI while the other three switches, S2, S3 and S4, remain in a second position or mode, as shown in S2, S3 and S4, to render these last three loads inactive, in a power conserving mode. The switching is done through a single switching control means SCM which sequentially controls the position or state of the four switches. In a normal sequence, each switch is on in a first or heating mode for a short period of time while the other three switches are in the second position to inactivate power to the load for a longer period of time. When the switching control means is opened to move S1 to the second mode, S2 is closed to the heating state while S3 and S4 are unchanged. Each switch is thus sequentially and solely moved to the first or heating mode.

A voltage measurement means VMM is also provided in the circuit for sensing the voltage to the active load segment only. A single voltage measurement means is adequate for any one heating device 14 to detect or read that there is substantially adequate and constant voltage during normal operations regardless of which one of the loads is activated.

Also in the circuit are a plurality of impedance measurement means, IMM, which in this case measure resistance, one for each switch or load segment. These impedance measurement means apply a pulse of known voltage to two known resistors in electrical series with the load and thereby detect the load resistance by checking that a proper voltage level appears across the second known series resistor when the pulse is applied. One such impedance measurement device is provided for each switch, independent of the other switches.

The output of the impedance measurement devices and the voltage measurement device are fed to a current determiner means, CDM, for determining the current inferentially from the impedance and voltage of the circuit. The output of the current determining means is provided to an output means which may, in the present embodiment, indicate whether or not a sufficient current is being fed to the load. This may take the form of a single light on the instrument dashboard for operator viewing.

Figure 3:
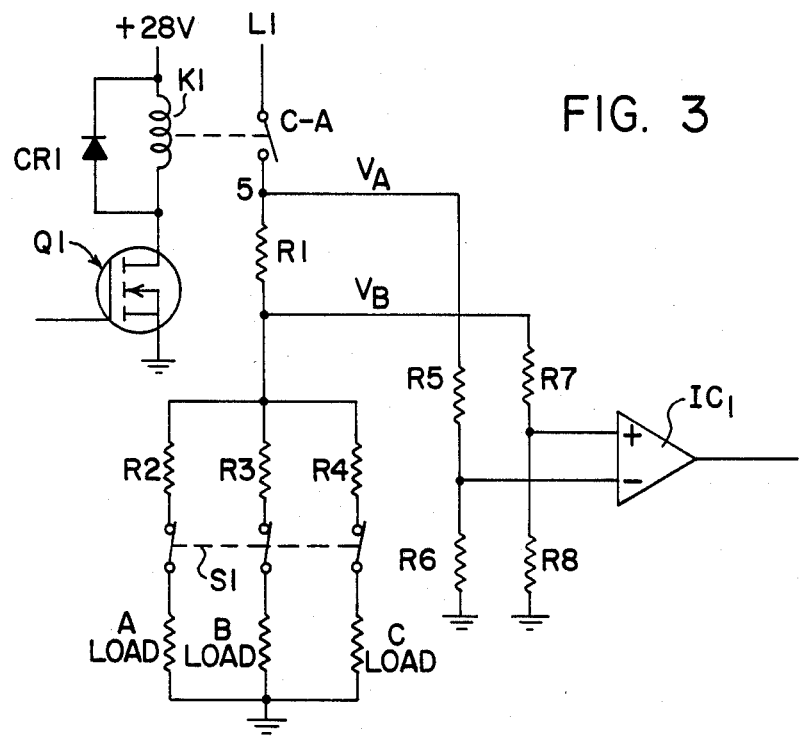
FIGS. 3 and 4 are circuit diagrams of various elements of the FIG. 2 circuit of the instant invention.
Figure 4:
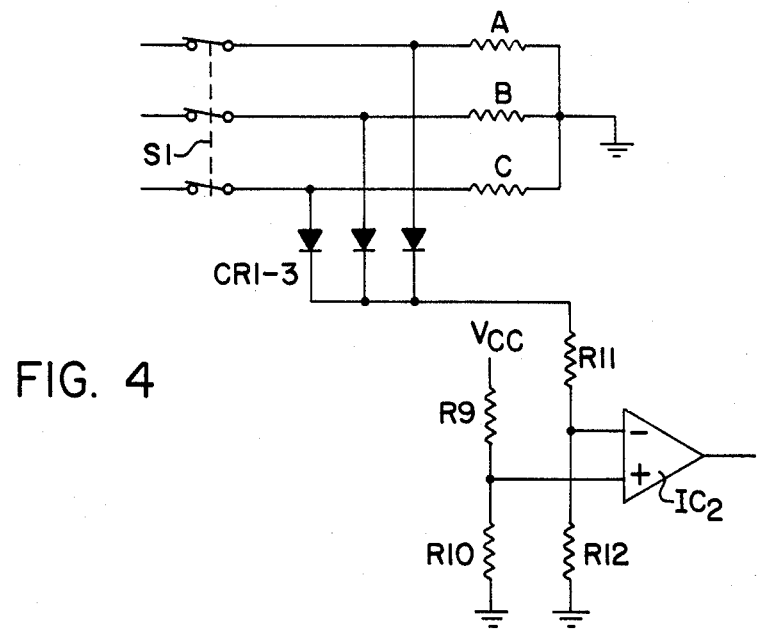

The impedance measurement device includes a limited source of power for sending out current through each switch when in the second state or mode. This is accomplished from the switch control means feeding the field effect transistor Q1, as shown in FIG. 3, to operate relay K1 to periodically close contact C-A in association therewith. Certain circuit components of the FIG. 2 block diagram are shown in FIGS. 3 and 4. This current from L-1 flows from the vertical power line down, past point 5, through resistor R1 and then through resistors R2, R3 and R4 and then through load resistors shown as A, B, and C. Together these load resistors A, B and C constitute one of the resistance elements, as for example LI. The three switches are coupled together as a threepole switch which constitutes a single relay such as S1 to a single resistance element such as LI.

There are two lines Va and Vb positioned across R1 which is of a known value. The Vb line leads to ground through series resistors R7 and R8 with a pickoff line therebetween leading to the positive input of comparator IC1. The Va line leads to ground through series resistors R5 and R6 with a pickoff line therebetween leading to the negative input of comparator IC1. All resistance values in the circuit are known. The voltage across the resistive combination of R2,3,4,A,B,C can be predicted and compared against a reference value coming into the negative input of the comparator IC1 against the voltage at the positive input. Whenever the positive value of voltage to the comparator exceeds the negative value of voltage to the comparator, the comparator output will be "high" and will thus feed into the current determining means, CDM to change the state of the output means, OM.

Shown in FIG. 4 is a circuit diagram for the voltage measuring means VMM. In a manner similar to the impedance measurement means, IMM described above, a comparator IC2 is fed from negative and positive lines by voltage readings from its two input lines. The voltage measurement means is activated at all times of circuit operation for determining the voltage present at any one of the loads. The switch control means SCM in FIG. 2 merely tells the voltage measurement means when to send the information it reads into the current determining means to thereby indicate when such read voltage is valid for doing the current determination function. The information to be read is valid only when the load is activated through the switching control means.

One segment of the load is again shown as parallel resistors A, B and C in series on the lines with a three pole switch, which constitutes its associated switch means, as for example S1. The lines are tapped by three diodes which are diode OR'd together whereby if any one of the diodes is energized, it will feed to grounded resistors R11 and R12. Therebetween is the tap leading to the negative input of the comparator IC1. The voltage across resistor R10 to ground is of a known DC reference value and is a voltage reference point and is fed to the positive input of the comparator IC2.

The switch control means, SCM, block of FIG. 2 is simply composed of two basic timing elements. The first is a basic timer operative to switch the positions or modes of the various four switch means shown in the block diagram. In the present operative and preferred embodiment, the switches are on an 80-second timer cycle from the switch control means whereby only one of the switch means, as for example S1, will be in the first mode, as shown in FIG. 1, to permit a current flow from the power source PS to the load, for example LI, for 20 seconds. Upon switching and changing the mode of any switch means to the second mode, as shown in S2, S3 and S4, the associated load will be coupled with the impedance measurement means. After the first 20 second period elapses as determined by the switch control means, SCM, the second switch is sequentially moved to the first state for heating the second load while the first switch is moved to the second mode like the third and fourth switches in time sequence. The switch control means, SCM, also has a second switching function for activating the voltage measurement means, VMM, impedance measurement means, IMM, and current determining means, CDM, for periodically probing those switches which are in the second state, i.e., the state wherein no current other than the probing test current is flowing from the power source, PS to the load. This second switching function means takes the form of a digital clock to pulse the measurements and determining means at the appropriate time. In the preferred embodiment, the second switching function would send out pulses for approximately 20 milliseconds each, occurring every 625 milliseconds, continuously through their operational cycle. This basically enables the measurement and determining means, at the appropriate times, to check for the existence of proper functioning of the load.

The current determining means, CDM, which could readily take the form of a determiner is shown in the block diagram of FIG. 2, is not shown in a specific circuit diagram. It would, in a preferred simple state, include two logic gates, one from the impedance measurement means and one from the voltage measurement means, for determining whether or not to feed to the output means, OM. If, for example, the voltage measurement and impedance measurement devices are both feeding properly to the current determining means, indicative of proper power to the load segments, the gates forming the current determining means would not provide an error output signal to the output. If either the impedance measurement means or the voltage measurement means receive signals indicative of improper power to the load segments from the circuit component which they are detecting, a positive pulse would be emitted from one of the comparators in the current determining means to activate the output means. The current determining means would, in its simplist form, have a gate or a latch, as for example, a flip flop, which would feed the output only when a signal of impropriety were received from one of the two measurement means.

The current determining means also receives a timed pulse from the switching control means concurrently with the pulse to the input and measurement devices so that it knows when to interrogate the measurement devices.

It should be understood however that the current determining means could take the form of a more sophisticated control circuitry and not merely an off/on situation but an analog through appropriate electronics, preferably digital which could serve a feed back to the power source for increasing or decreasing the source of potential for maximum efficiency and energy saving capabilities, or other needs for an analog signal, if such were considered desirable. In the instant preferred embodiment, however, the output could be to an illumination device on the operator panel to inform the operator of the aircraft that the de-icers or anti-icers were not operating properly and the de-icing or anti-icing functions were not occurring. In such situations the pilot could take over manually to observe the situation and perhaps then fly lower to get out of the difficult situation.

While the instant invention here is described with respect to a preferred embodiment thereof, it is intended to be covered broadly within the spirit and scope of the appended claims.

I claim:

1. A circuit for monitoring electrical current from a source of power along lead line means to a load means comprising switch means in said lead line means being sequentially operative from a first mode wherein load current may flow from the source of power to said load means, to a second mode wherein test current may flow along another line means for determining whether the impedance of load is the correct magnitude, impedance measurement means operatively coupled with said switch means for determining impedance of the load means when said switch means is in the second mode, voltage measurement means for determining the voltage present at the load means, current determining means operatively coupled with said impedance measurement means and said voltage measurement means for determining load current being delivered to the load means as a function of signals received from said impedance measurement means and said voltage measurement means, switching control means for periodically changing said switch means from the first mode to the second mode and for periodically rendering operative said impedance measurement means, voltage measurement means and current determining means, and output means activated from said current determining means for response to whether or not the load means are being operated in a predetermined manner.

2. A circuit for monitoring electrical current from a source of power along lead lines to a plurality of loads comprising a plurality of switch means, one in each of the lines extending from the source of power to the plurality of loads, each said switch means being sequentially operative from a first mode, wherein load current may flow from the source of power to each of the plurality of loads, to a second mode wherein test current may flow along another line for determining whether the impedance of the plurality of load is the correct magnitude, impedance measurement means operatively coupled with each of said switch means for determining impedance of each of the plurality of loads when the switch means to which it is operatively coupled is in its second mode, voltage measurement means for determining the voltage present at the plurality of loads, current determining means operatively coupled with the impedance measurement means and the voltage measurement means for determining load current being delivered to the plurality of loads as a function of signals received from the impedance measurement means and voltage measurement means, switching control means for periodically and sequentially changing each of said switch means from the first mode to the second mode and also for periodically rendering operative the impedance measurement means, voltage measurement means and current determining means, and output means activated from the current determining means for response to whether or not the load means are being operated in a predetermined manner.

3. A circuit for monitoring electrical current comprising a plurality of electrical resistance elements, a source of power along lead lines coupling said source of power to each of said resistance elements, a plurality of switch means, one in each of said lines extending from said source of power to said plurality of elements, each said switch means being sequentially operative from a first mode, wherein load current may flow from said source of power to each of said plurality of elements, to a second mode wherein test current may flow along a second line means for determining whether the impedance of the plurality of elements is the correct magnitude, impedance measurement means coupled by said second line means with each of said switch means for determining impedance of each of said plurality of elements when the switch means to which it is operatively coupled is in its second mode, voltage measurement means for determining the voltage present at said plurality of elements, current determining means operatively coupled with the impedance measurement means and the voltage measurement means for determining load current being delivered to said plurality of elements as a function of signals received from the impedance measurement means and voltage measurement means, switching control means for periodically and sequentially changing each of said switch means from the first mode to the second mode and also for periodically rendering operative the impedance measurement means, voltage measurement means and current determining means, and output means activated from the current determining means for response to whether or not said plurality of elements are being operated in a predetermined manner.

* * * * *